United States Patent
Nagahara

(10) Patent No.: US 6,580,564 B2
(45) Date of Patent: Jun. 17, 2003

(54) WIDE-ANGLE ZOOM LENS AND PROJECTION-TYPE DISPLAY UNIT USING IT

(75) Inventor: Akiko Nagahara, Koshigaya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 96 days.

(21) Appl. No.: 10/097,956

(22) Filed: Mar. 15, 2002

(65) Prior Publication Data

US 2002/0181120 A1 Dec. 5, 2002

(30) Foreign Application Priority Data

Mar. 27, 2001 (JP) .......................... 2001-090153

(51) Int. Cl.[7] .............................................. G02B 15/14
(52) U.S. Cl. ....................................... 359/683; 359/682
(58) Field of Search ................................ 359/680–682, 359/676, 683

(56) References Cited

U.S. PATENT DOCUMENTS 5,847,875 A * 12/1998 Kodama et al. ............ 359/557
6,008,952 A * 12/1999 Yamamoto .................. 359/683
6,137,638 A * 10/2000 Yamagishi et al. ......... 359/682

FOREIGN PATENT DOCUMENTS

JP 5-297276 11/1993
JP 10-268193 10/1998

* cited by examiner

Primary Examiner—Georgia Epps
Assistant Examiner—William Choi
(74) Attorney, Agent, or Firm—Arnold International; Bruce Y. Arnold

(57) ABSTRACT

A wide-angle zoom lens is disclosed having five lens groups of negative, positive, positive, negative, and positive refractive power, respectively, in sequential order from the magnification side. The first lens group is fixed during zooming and is formed of first and second subgroups, each of negative refractive power. Each subgroup moves relative to the other subgroup, as well as along the optical axis, during focusing. Further, the second, third and fourth lens groups are each moved along the optical axis such that the spacing between these lens groups varies for zooming and correction of what would otherwise be excessive curvature of field caused by zooming, and the fifth lens group is fixed during zooming. Various conditions are satisfied so as to favorably correct aberrations, provide an image angle of about 70° at the wide-angle end, and provide room on the reducing side for the insertion of a beam-combining prism.

8 Claims, 14 Drawing Sheets

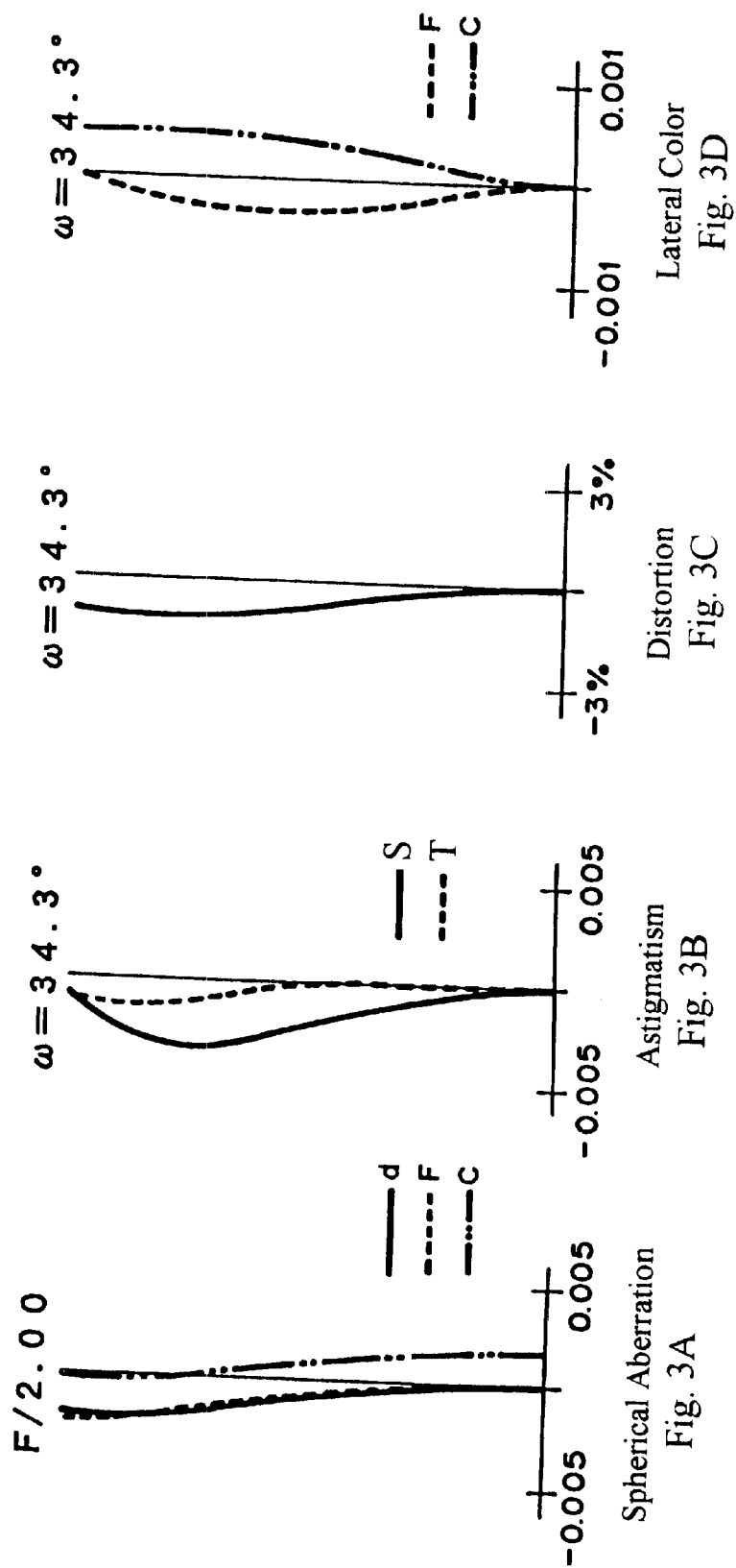

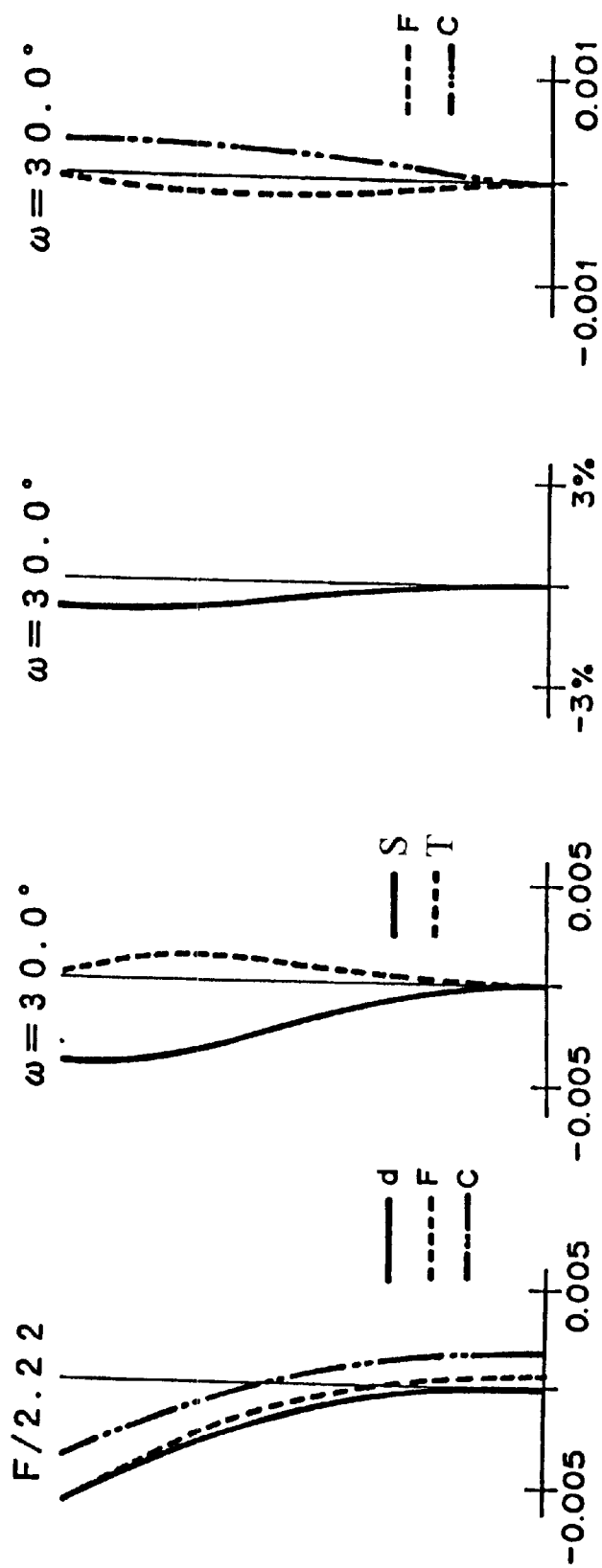

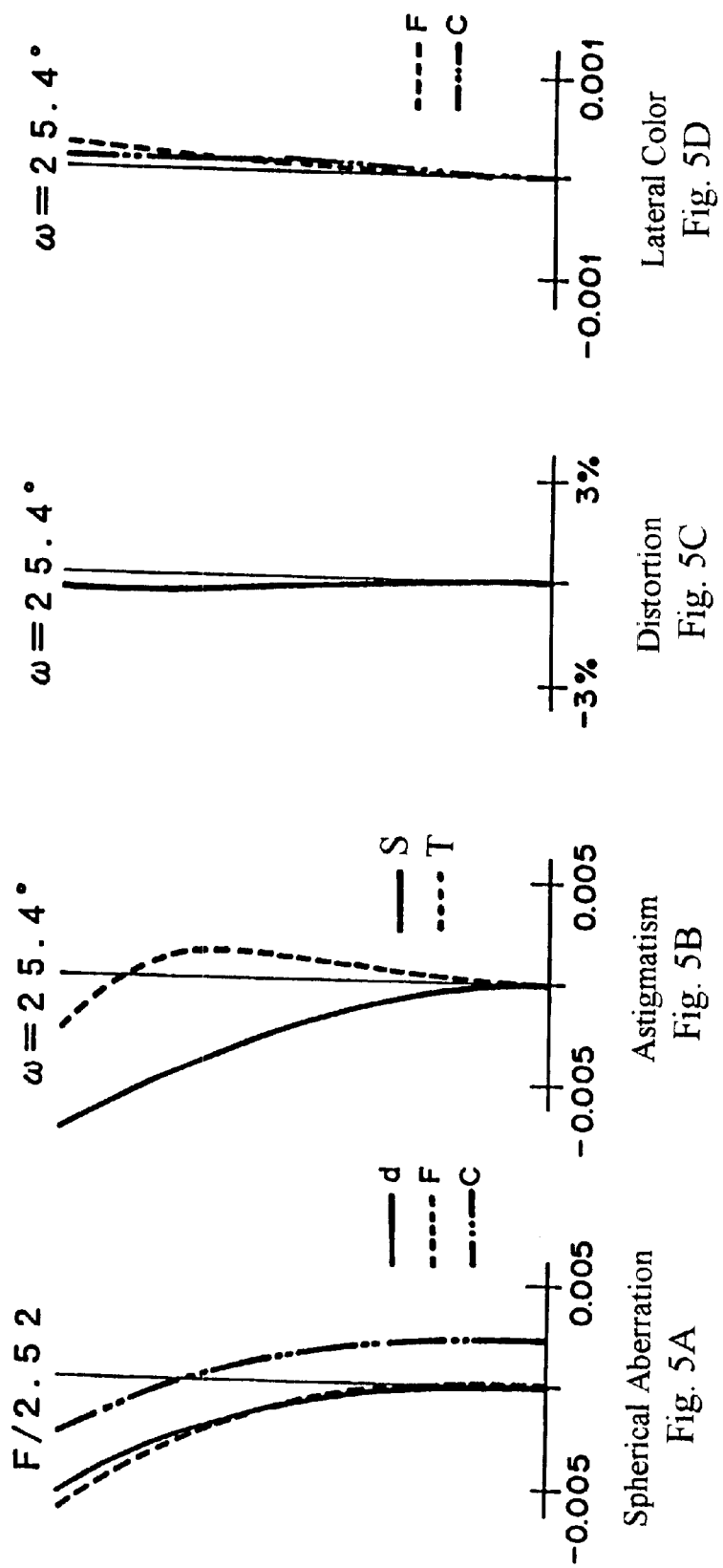

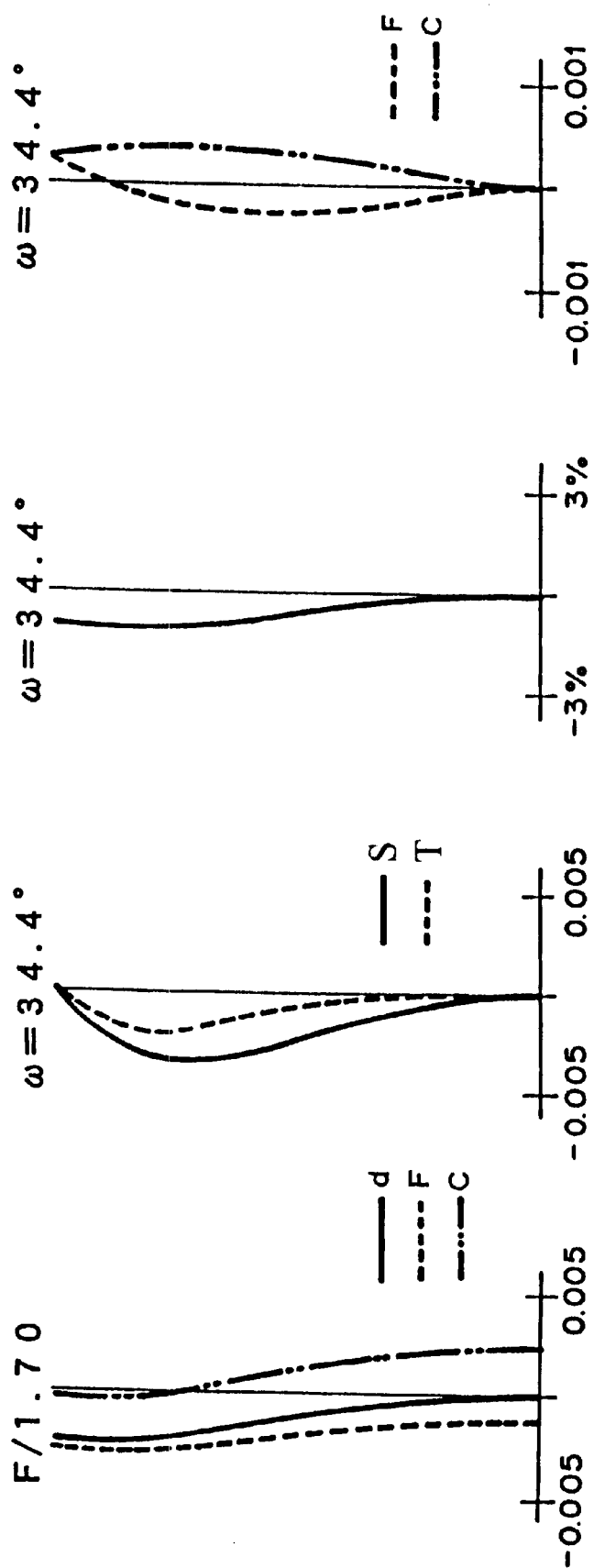

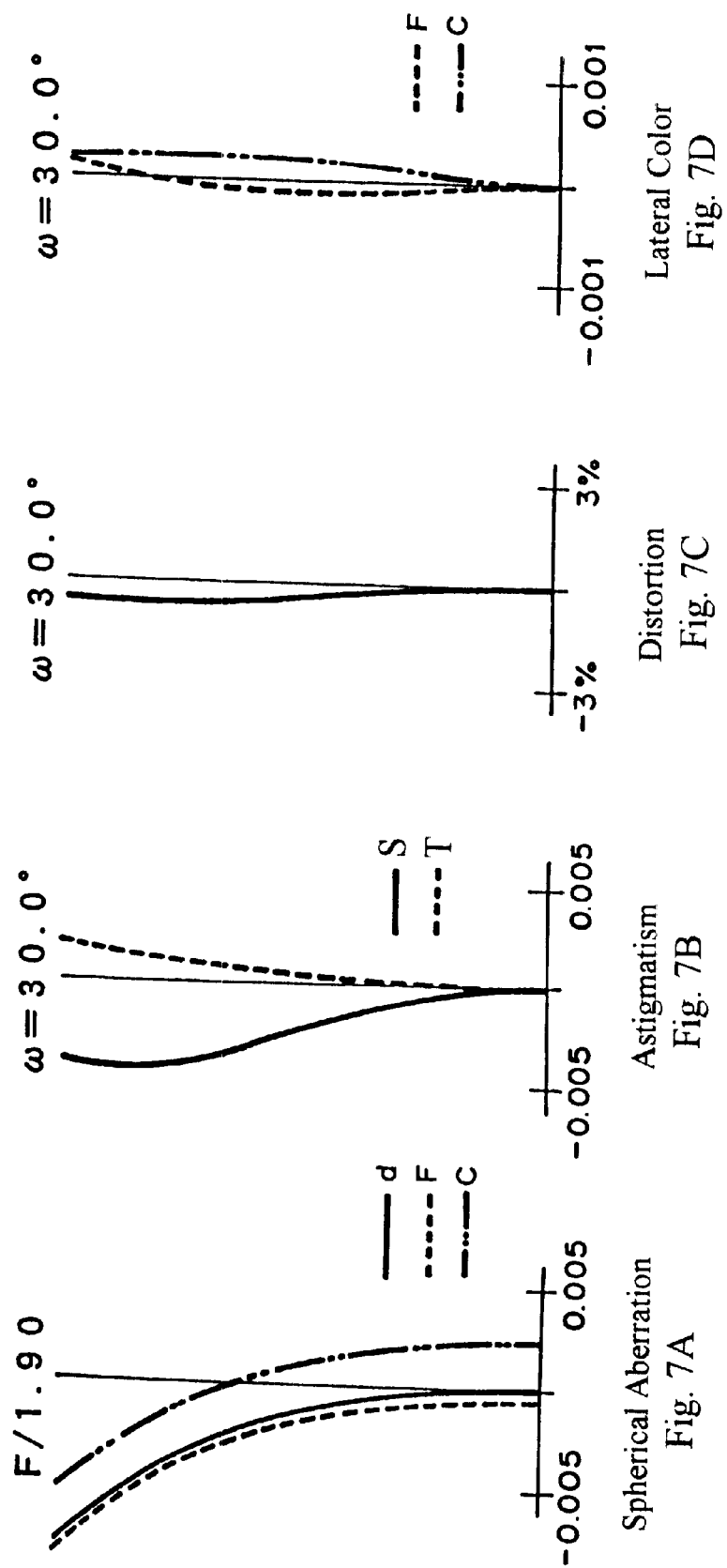

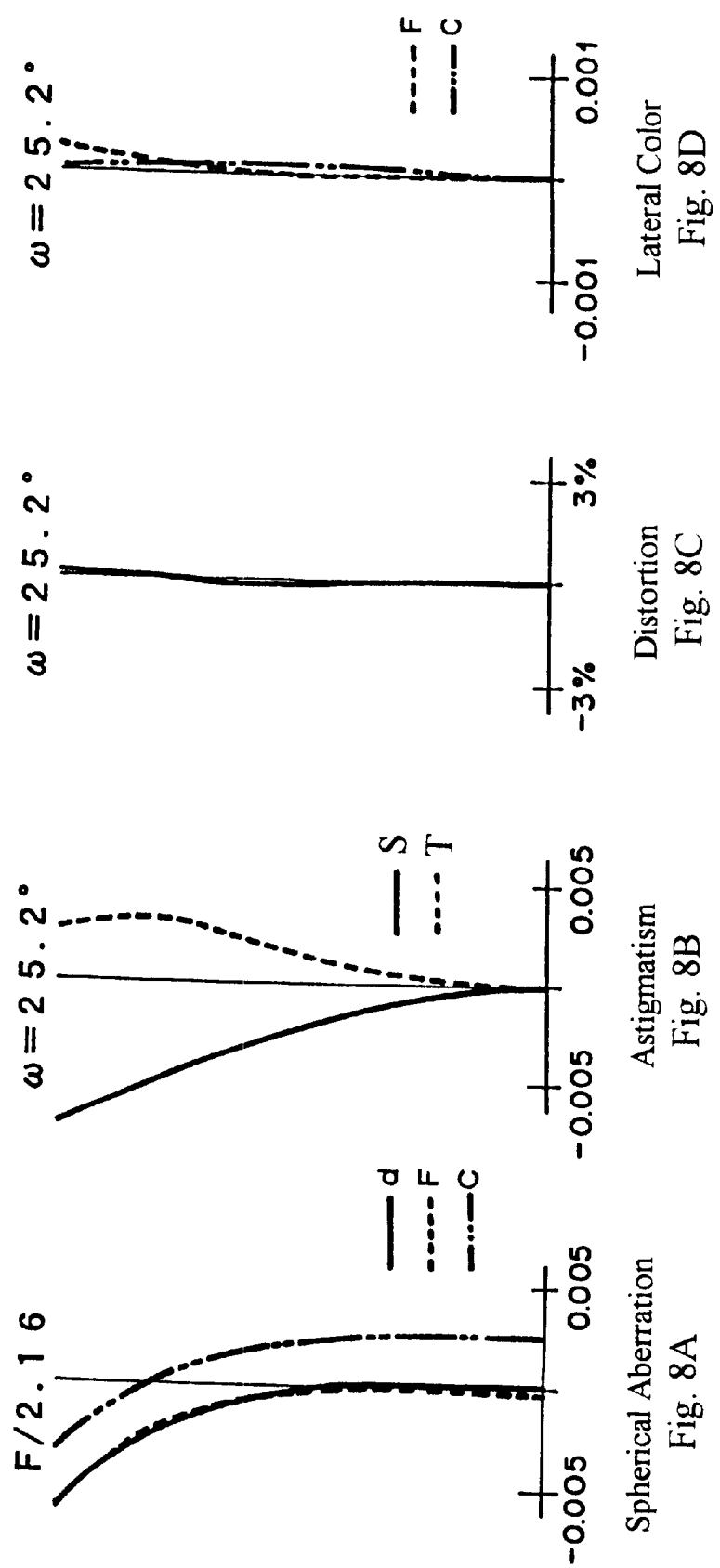

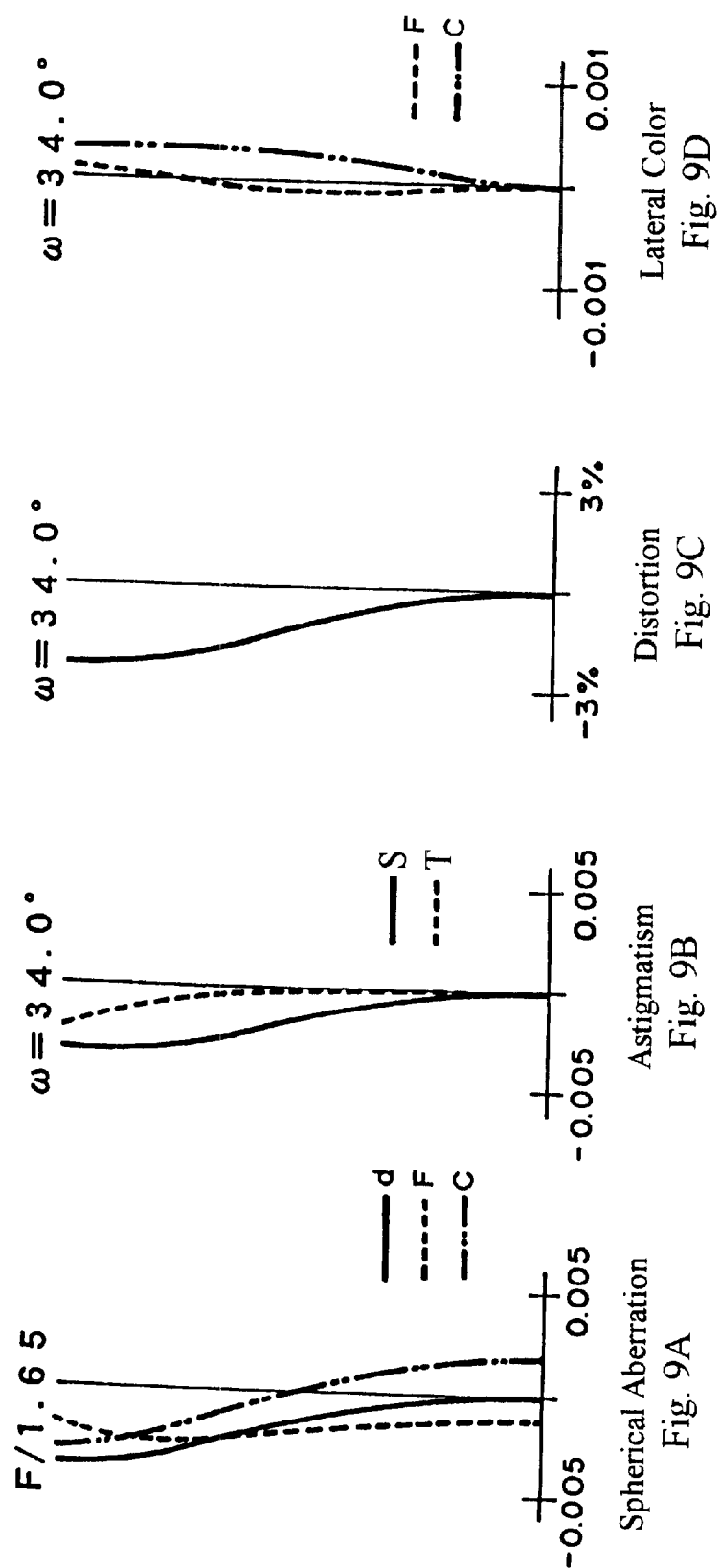

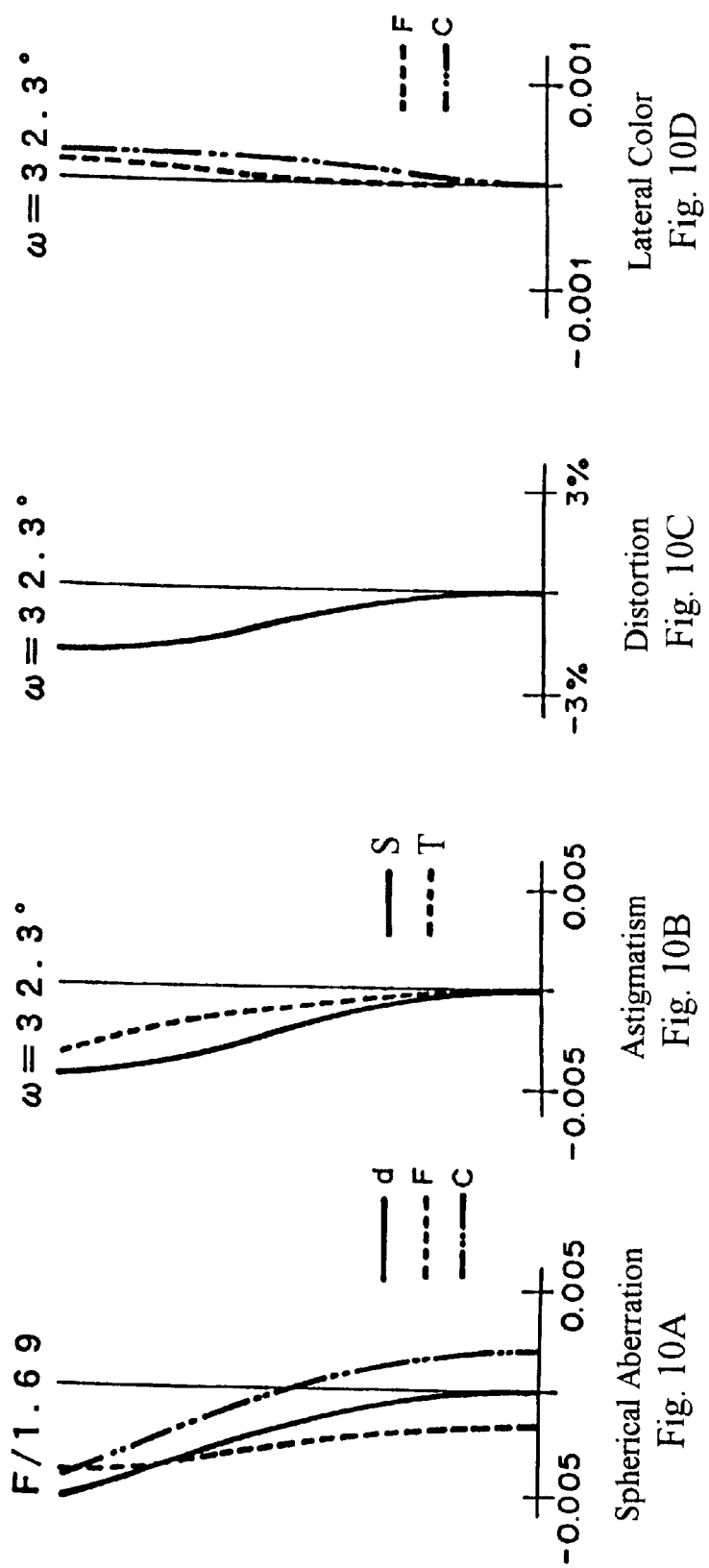

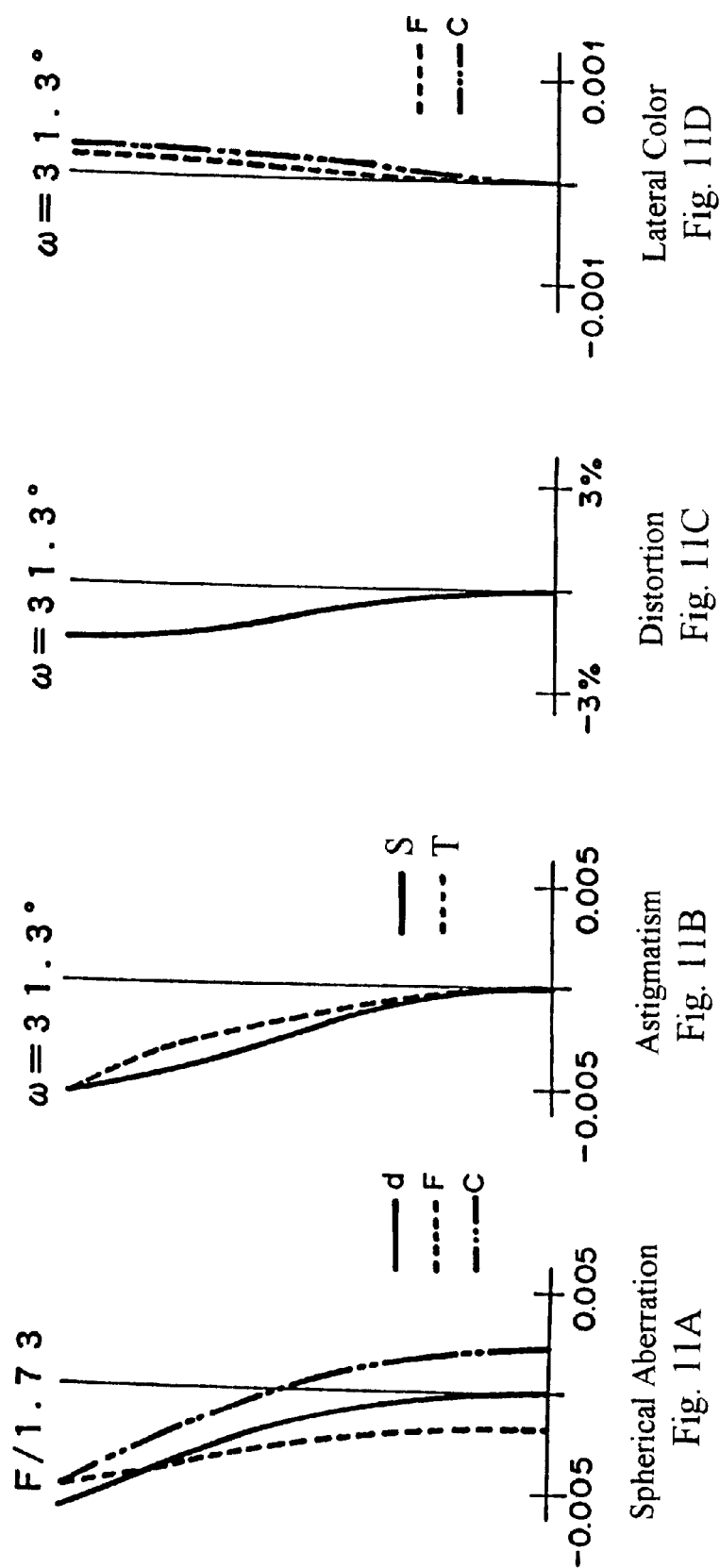

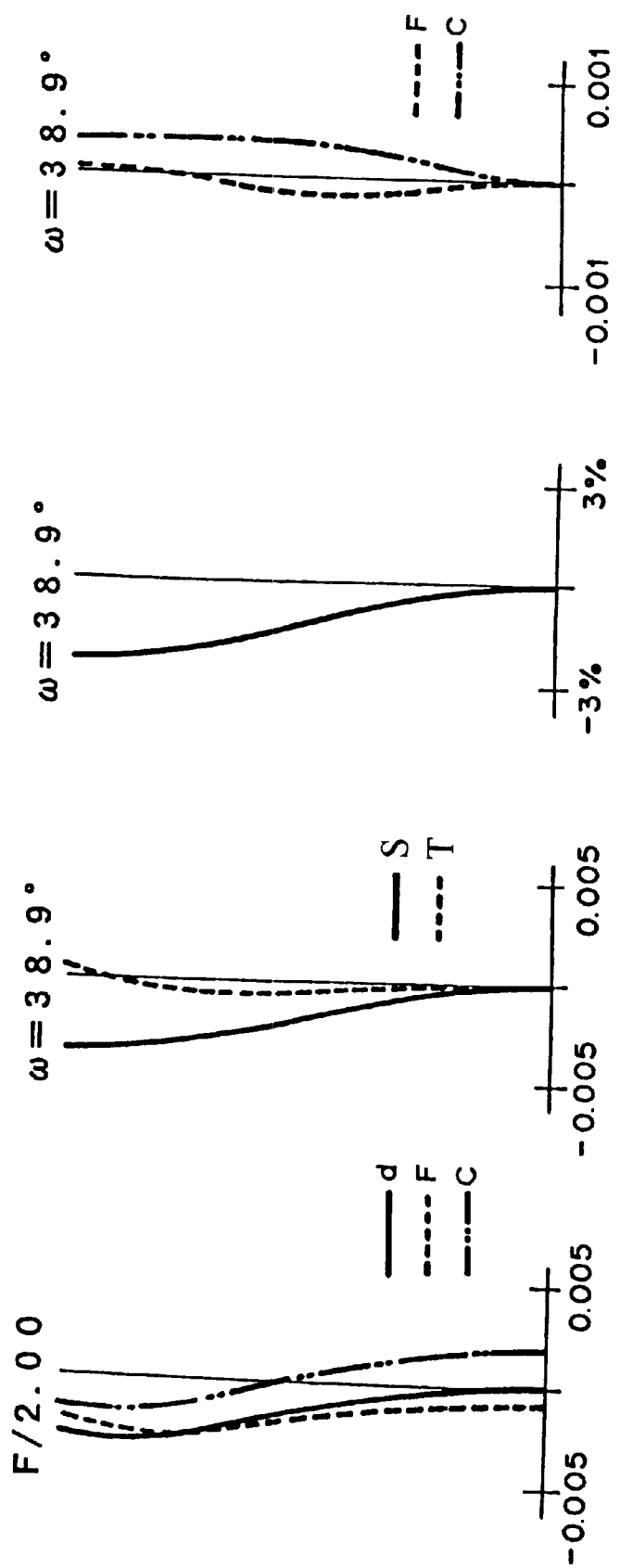

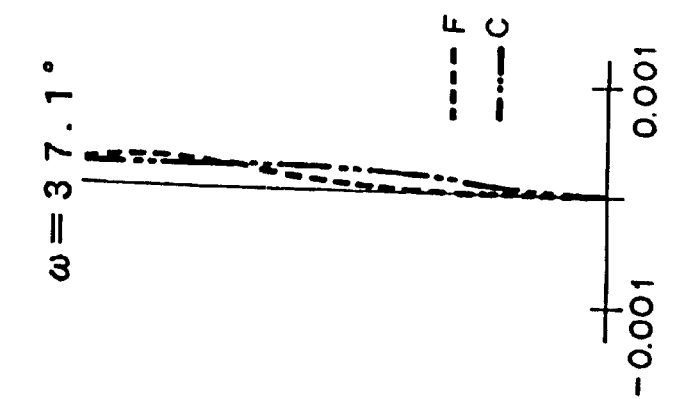
Lateral Color
Fig. 13D
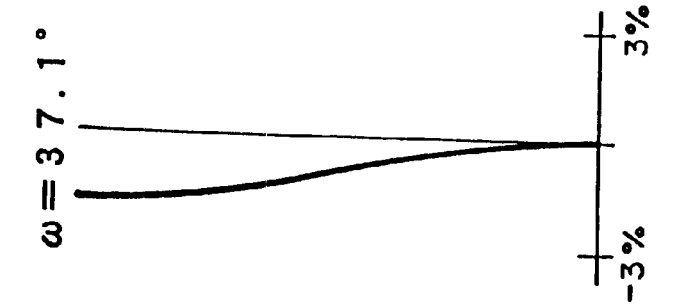
Distortion
Fig. 13C
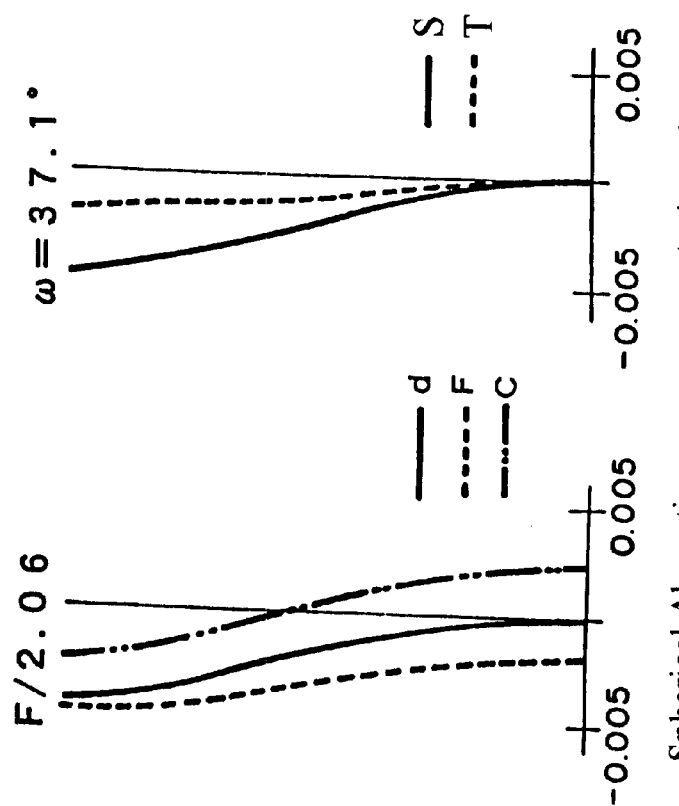
Astigmatism
Fig. 13B
Spherical Aberration
Fig. 13A

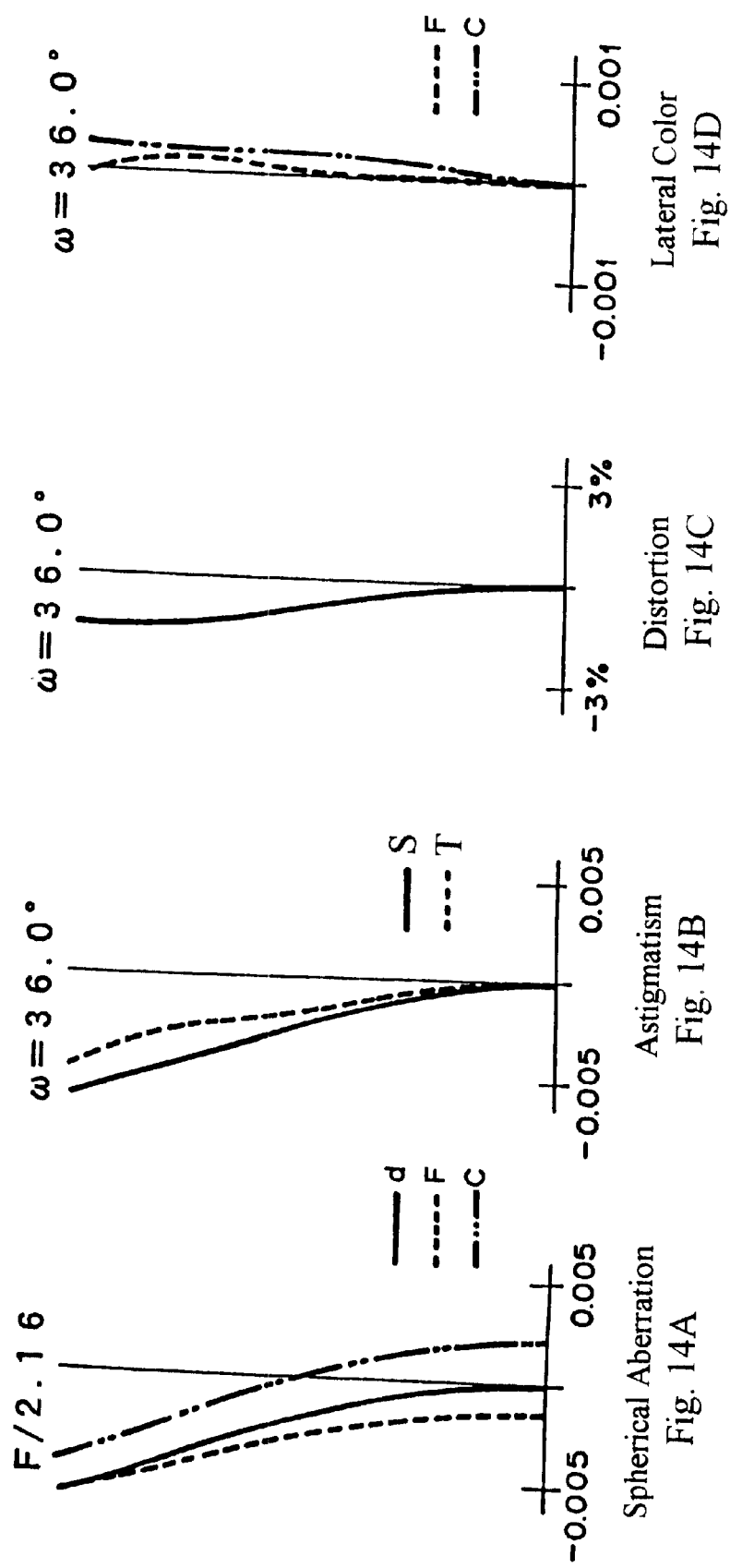

WIDE-ANGLE ZOOM LENS AND PROJECTION-TYPE DISPLAY UNIT USING IT

BACKGROUND OF THE INVENTION

A conventional zoom lens is described in Japanese Laid-Open Application H5-297276 that includes, in sequential order from the object side, a first lens group of negative refractive power that is fixed during zooming and moves for focusing, a second lens group of positive refractive power that moves for zooming, a third lens group of negative refractive power that moves for correction of field curvature caused by zooming, and a fourth lens group of positive refractive power that is fixed in position.

Many prior art zoom lenses are designed for use with small imaging devices such as a CCD array. In order to use a zoom lens in a projection-type display unit that uses a liquid crystal, a zoom lens that forms a projection image should have a large conjugate distance on the reducing side. This increases the lens size required. In addition, conventional techniques do not satisfactorily correct distortion when zoom lenses are used as projection lenses.

For a projection lens in a unit that uses a liquid crystal, it is desirable that the optical system be nearly telecentric on the reducing side of the projection lens. However, this is not a common feature of conventional zoom lenses. In addition, few conventional zoom lenses have a sufficiently large back focus that allows for the insertion of an optical system, between the zoom lens and the image surface, for dividing or combining color components, when necessary.

To overcome the above problems, a known zoom lens is described in Japanese Laid-Open Application H10-268193 that includes, in order from the object side, a first lens group of negative refractive power that is fixed during zooming and moves for focusing, a second lens group of positive refractive power that moves during zooming, a third lens group of positive refractive power that moves during zooming, a fourth lens group of negative refractive power that moves during zooming for correction of curvature of field, and a fifth lens group of positive refractive power that is fixed during zooming, wherein the zoom lens satisfies certain conditions.

Recently, there has been a demand for a projection-type display unit to project images onto a large screen from a short distance using a wider-angle projection lens. The lens described in the above-mentioned Japanese Laid-Open Application H10-268193 is compact but with a sufficient conjugate distance on the reducing side for the insertion of a beam-combining prism for projecting color images, and this lens is also nearly telecentric on the reducing side. However, this lens provides an image angle of only 23–25 degrees, and thus hardly satisfies the demand that the lens be able to project images onto a large screen from a short distance. Downsizing of the projection-type display unit is also a recent demand which requires the downsizing of the projection lens used in such a display unit, as well.

In view of the above, the present applicant disclosed a five-group zoom lens in Japanese Patent Application 2000-339955. The zoom lens includes second and third lens groups having positive refractive power and a fourth, movable, lens group having negative refractive power. The focal length of each lens group is appropriately arranged in order to reduce fluctuation in aberrations due to zooming while providing larger image angles than conventionally available. This also allows the lens system to have a compact structure on the reducing side. Rays in the tangential plane on the reducing side are nearly parallel to the optical axis and an appropriate length of back focus is available for inserting, for example, a beam combiner for projecting color images. Therefore, a wide-angle projection-type display unit using this zoom lens can be compact and project high-resolution images.

However, recent projection-type display units are supposed to be used in different circumstances. Larger projected images are often desired even in a smaller projection space. To satisfy this demand, a zoom lens that projects with wider-angle images is required. The five-group zoom lens described in the above specification has an image angle of approximately 60° at the wide-angle end, which is relatively large. However, when an attempt is made to obtain still wider-angle images, for instance, an image angle of approximately 70°, a problem may arise in that it is difficult to correct the curvature of field.

BRIEF SUMMARY OF THE INVENTION

The object of the present invention is to provide a wide-angle zoom lens having an image angle of approximately 70°, a large back focus, a nearly uniform distribution of rays relative to the optical axis in the tangential plane on the reducing side, a compact structure on the reducing side, and satisfactorily corrected aberrations, particularly curvature of field. The present invention also aims to provide a projection-type display unit that uses the zoom lens described above.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3D show the spherical aberration (in mm), astigmatism (in mm), distortion, and lateral color (in mm), respectively, of the zoom lens of Embodiment 1 at the wide-angle end of zoom when focused on a nearby object;

FIGS. 4A–4D show the spherical aberration (in mm), astigmatism (in mm), distortion, and lateral color (in mm), respectively, of the zoom lens of Embodiment 1 at the middle zoom position when focused on a nearby object;

FIGS. 5A–5D show the spherical aberration (in mm), astigmatism (in mm), distortion, and lateral color (in mm), respectively, of the zoom lens of Embodiment 1 at the telephoto end when focused on a nearby object;

FIGS. 6A–6D show the spherical aberration (in mm), astigmatism (in mm), distortion, and lateral color (in mm), respectively, of the zoom lens of Embodiment 2 at the wide-angle end when focused on a nearby object;

FIGS. 7A–7D show the spherical aberration (in mm), astigmatism (in mm), distortion, and lateral color (in mm), respectively, of the zoom lens of Embodiment 2 at the middle zoom position when focused on a nearby object;

FIGS. 8A–8D show the spherical aberration (in mm), astigmatism (in mm), distortion, and lateral color (in mm), respectively, of the zoom lens of Embodiment 2 at the telephoto end when focused on a nearby object;

FIGS. 9A–9D show the spherical aberration (in mm), astigmatism (in mm), distortion, and lateral color (in mm), respectively, of the zoom lens of Embodiment 3 at the wide-angle end when focused on a nearby object;

FIGS. 10A–10D show the spherical aberration (in mm), astigmatism (in mm), distortion, and lateral color (in mm), respectively, of the zoom lens of Embodiment 3 at the middle zoom position when focused on a nearby object;

FIGS. 11A–11D show the spherical aberration (in mm), astigmatism (in mm), distortion, and lateral color (in mm), respectively, of the zoom lens of Embodiment 3 at the telephoto end when focused on a nearby object;

FIGS. 12A–12D show the spherical aberration (in mm), astigmatism (in mm), distortion, and lateral color (in mm), respectively, of the zoom lens of Embodiment 4 at the wide-angle end when focused on a nearby object;

FIGS. 13A–13D show the spherical aberration (in mm), astigmatism (in mm), distortion, and lateral color (in mm), respectively, of the zoom lens of Embodiment 4 at the middle zoom position when focused on a nearby object; and, FIGS. 14A–14D show the spherical aberration (in mm), astigmatism (in mm), distortion, and lateral color (in mm), respectively, of the zoom lens of Embodiment 4 at the telephoto end when focused on a nearby object.

DETAILED DESCRIPTION

The present invention relates to a zoom lens for use in a camera that uses an image-detecting device such as a CCD array, silver-salt film, and so on. The present invention also relates to a zoom lens for use in a projection-type television, and especially to a wide-angle zoom lens that is used in a projection-type display unit that uses a spatial light modulator such as liquid crystal to modulate a beam that is then projected by the projection lens, and to a projection-type display unit that uses such a zoom lens.

The wide-angle zoom lens according to the present invention is formed of, in sequential order from the magnification side, a first lens group of negative refractive power, a second lens group of positive refractive power, a third lens group of positive refractive power, a fourth lens group of negative refractive power, and a fifth lens group of positive refractive power. The first lens group is formed of two subgroups, each of negative refractive power. Both subgroups are fixed during zooming and moved along the optical axis such that the spacing between the two subgroups varies during focusing. Each of the second through fourth lens groups are moved along the optical axis such that the spacings between these lens groups varies for zooming and to correct for what would otherwise be excessive curvature of field caused by zooming. The fifth lens group is fixed during focusing and zooming. In addition, the following Conditions (1) to (5) are satisfied:

$1.5 < f_2/f < 4.0$            Condition (1)

$2.0 < f_3/f < 5.0$            Condition (2)

$1.5 < f_5/f < 3.0$            Condition (3)

$-1.8 < f_1/f < -0.9$          Condition (4)

$0.4 < f_1/f_{1A} < 1.0$          Condition (5)

where f is the focal length of the zoom lens at the wide-angle end, $f_1$ is the focal length of the first lens group, $f_2$ is the focal length of the second lens group, $f_3$ is the focal length of the third lens group, $f_5$ is the focal length of the fifth lens group; and $f_{1A}$ is the focal length of the first subgroup of the first lens group.

It is preferable that the lens element surface of the second lens subgroup $G_{1B}$ that is nearest the magnification side be concave.

It is also preferable that the spacing between the second and third lens groups be reduced when zooming toward the telephoto end.

The present invention also includes the wide-angle zoom lens as described above in combination with a projection-type display unit that uses a spatial light modulator, such as a light valve, to modulate a light beam with image information for display purposes.

Figure 1:
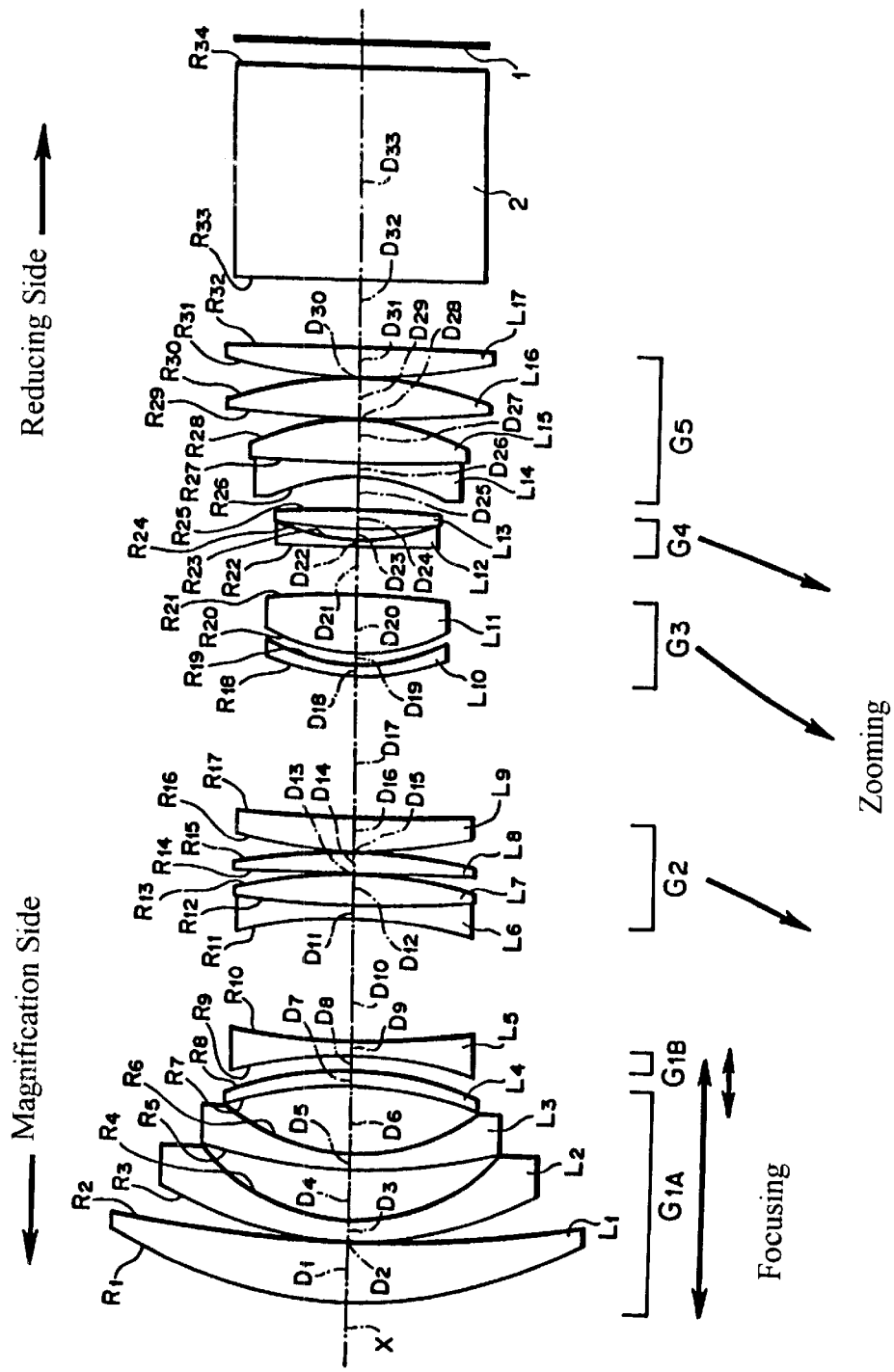
FIG. 1 shows the basic lens element configuration at the wide-angle end of the zoom lens of Embodiment 1, and is also representative of the lens element configuration of Embodiment 2.

The invention will first be described in general terms. FIG. 1 shows the basic lens element configuration of the wide-angle zoom lens of Embodiment 1 of the present invention at the wide-angle end, and this figure is also representative of the basic lens element configuration of Embodiment 2. This zoom lens is described hereinafter as representative of the present invention.

The zoom lens is formed of, in sequential order from the magnification side, a first lens group $G_{1A}G_{1B}$ having negative refractive power, a second lens group $G_2$ having positive refractive power, a third lens group $G_3$ having positive refractive power, a fourth lens group $G_4$ having negative refractive power, and a fifth lens group having positive refractive power. The first lens group is fixed during zooming and is formed of subgroups $G_{1A}$ and $G_{1B}$, each of negative refractive power. Each subgroup is moved along the optical axis such that the spacing between the two subgroups is varied during focusing. The second, third and fourth lens groups are each moved along the optical axis such that the spacing between these lens groups varies for zooming and correction of what would otherwise be excessive curvature of field caused by zooming. The fifth lens group $G_5$ is fixed during focusing and zooming. The spacing between the second and third lens groups is reduced when zooming toward the telephoto end.

The lens element that is nearest the magnification side in the lens subgroup $G_{1B}$ (i.e., the fifth lens element $L_5$ in FIG. 1) has negative refractive power with its concave surface on the magnification side. A glass block 2 that includes within it a filter for blocking infrared rays, a low pass filter, or an optical system for combining or dividing colors, is positioned between the fifth lens group $G_5$ and an image surface 1. In the figure X indicates the optical axis.

The first lens group is fixed during zooming and is used for focusing. The second, third, and fourth lens groups $G_2$, $G_3$, and $G_4$ are moved along the optical axis such that the spacings between these lens groups varies for zooming and for correction of curvature of field caused by zooming. The lens group $G_5$ is a relay lens that is fixed during zooming. The spacing between the second and third lens groups $G_2$ and $G_3$ is reduced when zooming toward the telephoto end. The zoom lens is configured with the above Conditions (1) to (5) being satisfied.

A projection-type display unit according to the present invention includes a light source, a spatial light modulator for inputting image information onto a projected beam of light, and the wide-angle zoom lens as described above. The wide-angle zoom lens serves as a projection lens for projecting optical images using light that has been modulated by the spatial light modulator onto a screen. For instance, a liquid crystal video projector provided with the wide-angle zoom lens shown in FIG. 1 receives a nearly collimated light flux from a light source (not shown) on the right side of this figure. The light flux is modulated with image information at an image surface 1 of a spatial light modulator, such as a liquid crystal display panel, and is projected as an enlarged image onto a screen (not shown) at the left side of this figure by means of a zoom lens following glass block 2. Only one image surface 1 is shown in FIG. 1. However, in a conventional liquid crystal video projector, light flux is generally divided into three primary colors, R, G, and B, by an optical system for dividing colors that includes dichroic mirrors and lens arrays. Three liquid crystal display panels are positioned, one for each primary color, on the reducing side of the lens. Image information for that color is then used to modulate each individual light beam, and the light beams are then combined using, for example, the glass block 2 containing dichroic surfaces so as to produce a full-color image that is then projected by the wide-angle zoom lens onto a screen.

For zooming and correction of curvature of field caused by zooming, three lens groups of the zoom lens (namely, the second lens group $G_2$ having positive refractive power, the third lens group $G_3$ having positive refractive power, and the fourth lens group $G_4$ having negative refractive power) are moved along th optical axis such that the spacings between these lens groups varies during zooming. This enables fluctuations in aberrations due to zooming to be reduced. By satisfying Condition (1) to (4) above, the amount of movement of these lens groups is minimized while maintaining a specified zoom ratio. This enables the overall length of the zoom lens to be reduced while maintaining favorable correction of aberrations.

In addition, the spacing between the second and third lens groups $G_2$ and $G_3$ is reduced when zooming toward the telephoto end. This reduces the movement amount required for zooming, and thereby improves the compactness of the zoom lens.

The first lens group $G_{1A}G_{1B}$ is moved for focusing. If the first lens group were to move as one integral unit during focusing, image angles larger than approximately 60 degrees would be difficult to provide. This is because image angles larger than approximately 60 degrees make the satisfactory correction of aberrations, particularly curvature of field, difficult to correct without providing more freedom of design. Therefore, in the present invention, the first lens group is divided into lens subgroups $G_{1A}$ and $G_{1B}$, and the spacing between these lens subgroups is varied during focusing. Each of lens subgroups $G_{1A}$ and $G_{1B}$ has negative refractive power and each subgroup is moved along the optical axis such that the spacing between these subgroups changes during focusing. This allows satisfactory correction of aberrations even at an image angle of approximately 70°. A wider image angle enables the required projection distance for a given image size to be reduced.

Next, the purpose of Conditions (1)–(5) will be explained.

Condition (1) specifies the range of the ratio of the focal length of the second lens group divided by the focal length of the zoom lens at the wide-angle end. When the lower limit is not satisfied, the aberrations generated by the second lens group become difficult to correct and, when the upper limit is not satisfied, the movement amount for zooming increases beyond the point that a compact zoom lens can be provided.

Condition (2) specifies the range of the ratio of the focal length of the third lens group divided by the focal length of the zoom lens at the wide-angle end. When the lower limit is not satisfied, the aberrations generated by the third lens group become difficult to correct and, when the upper limit is not satisfied, the movement amount for zooming increases beyond the point that a compact zoom lens can be provided.

Condition (3) specifies the range of the ratio of the focal length of the fifth lens group divided by the focal length of the zoom lens at the wide-angle end. When the lower limit is not satisfied, the back focus becomes too short so that the light rays are no longer nearly telecentric on the reducing side and, when the upper limit is not satisfied, the back focus becomes so long that the zoom lens is not compact. Also, when the upper limit is not satisfied, correction of aberrations becomes more difficult, due to the height of axial rays being too low for effective correction of aberrations.

Condition (4) specifies the range of the ratio of the focal length of the first lens group divided by the focal length of the zoom lens at the wide-angle end. When the lower limit is not satisfied, excessive aberrations, particularly spherical aberration and distortion, are generated by the first lens group. These aberrations are especially troublesome for a zoom lens having a small F-number. When the upper limit of Condition (4) is not satisfied, favorable correction of aberrations, particularly distortion and spherical aberration, becomes difficult due to the height of axial rays being too low for effective correction of aberrations.

Condition (5) specifies the range of the ratio of the focal length of the first lens group at the wide-angle end divided by the focal length of the first lens subgroup. When the lower limit is not satisfied, excessive movement is required of the first lens subgroup $G_{1A}$ during focusing, which changes the ray heights significantly and hampers well-balanced correction of distortion, curvature of field, and other aberrations. On the other hand, when the upper limit is not satisfied, excessive movement of the second lens subgroup $G_{1B}$ is required during focusing, which changes the ray heights significantly and again hampers well-balanced correction of aberrations.

Several embodiments of the invention will now be discussed in detail.

Embodiment 1

The wide-angle zoom lens according to Embodiment 1 has the basic lens element configuration shown in FIG. 1. This zoom lens comprises, in sequential order from the magnification side, a first lens group that is formed of a first subgroup $G_{1A}$ and a second subgroup $G_{1B}$, a second lens group $G_2$, a third lens group $G_3$, a fourth lens group $G_4$ and a fifth lens group $G_5$. Subgroup $G_{1A}$ is formed of four lens elements $L_1$ to $L_4$, and subgroup $G_{1B}$ is formed of a single biconcave lens element $L_5$. The second lens group $G_2$ is formed of, in sequential order from the magnification side, a lens formed of lens elements $L_6$ and $L_7$ that are cemented together, and two lens elements $L_8$ and $L_9$. The third lens group $G_3$ is formed of, in sequential order from the magnification side, two lens elements $L_{10}$ and $L_{11}$. The fourth lens group $G_4$ is formed of, in sequential order from the magnification side, two lens elements $L_{12}$ and $L_{13}$. The fifth lens group $G_5$ is formed of, in sequential order from the magnification side, a lens formed of lens elements $L_{14}$ and $L_{15}$ that are cemented together, and two lens elements $L_{16}$ and $L_{17}$.

Table 1 below lists the surface number # in sequential order from the magnification side, the radius of curvature R, the on-axis spacing D between surfaces, as well as the index of refraction $N_d$ and the Abbe number $v_d$ (both at the d line) of the optical elements of the wide-angle zoom lens according to Embodiment 1 of the invention. For convenience in scaling the values of R and D to produce a lens of a desired focal length, the data in the table has been normalized so that the focal length f of the zoom lens is unity at the wide-angle end. In the middle portion of the table are listed the values of the variable spacings D8, D10, D17, D21 and D25 for an object/projection distance at infinity as well as the focal length for each of the wide-angle end (Wide), the middle position of zoom (Middle), and at the telephoto end (Tele). To the left of these values is listed "∞" to indicate that the data given on the particular line is for an object/projection distance at infinity. In the line below the data for each of these positions are listed the spacings which focus the lens at the zoom position of the line above to a nearby object/projection screen distance. To the left of these values is listed "np" to indicate that the data given on the particular line is for an object/projection distance at the near point. In the bottom portion of the table is listed the magnification at the wide-angle end when focused on an object/projection distance at the near point np, as well as the values corresponding to each of Conditions (1) to (5) for this embodiment.

TABLE 1

| # | R | D | $N_d$ | $v_d$ |
|---|---|---|---|---|
| 1 | 2.872 | 0.373 | 1.71300 | 53.9 |
| 2 | 7.727 | 0.008 | | |
| 3 | 2.331 | 0.129 | 1.77250 | 49.6 |
| 4 | 1.180 | 0.331 | | |
| 5 | 3.203 | 0.106 | 1.71300 | 53.9 |
| 6 | 1.232 | 0.451 | | |
| 7 | −2.260 | 0.100 | 1.48749 | 70.4 |
| 8 | −2.089 | D8 (variable) | | |
| 9 | −2.522 | 0.099 | 1.49700 | 81.6 |
| 10 | 4.434 | D10 (variable) | | |
| 11 | −2.649 | 0.084 | 1.84666 | 23.8 |
| 12 | 8.792 | 0.208 | 1.80420 | 46.5 |
| 13 | −2.667 | 0.006 | | |
| 14 | −91.047 | 0.129 | 1.80518 | 25.5 |
| 15 | −3.869 | 0.006 | | |
| 16 | 2.917 | 0.228 | 1.80518 | 25.5 |
| 17 | 15.061 | D17 (variable) | | |
| 18 | 1.416 | 0.069 | 1.80518 | 25.5 |
| 19 | 1.108 | 0.079 | | |
| 20 | 1.202 | 0.383 | 1.51823 | 59.0 |
| 21 | −4.805 | D21 (variable) | | |
| 22 | 14.914 | 0.048 | 1.80518 | 25.5 |
| 23 | 1.255 | 0.074 | | |
| 24 | 3.641 | 0.125 | 1.80610 | 40.7 |
| 25 | −5.570 | D25 (variable) | | |
| 26 | −1.160 | 0.088 | 1.80518 | 25.5 |
| 27 | 13.720 | 0.279 | 1.48749 | 70.4 |
| 28 | −1.499 | 0.006 | | |
| 29 | 6.854 | 0.264 | 1.71300 | 53.9 |
| 30 | −2.454 | 0.006 | | |
| 31 | 3.405 | 0.184 | 1.84666 | 23.8 |
| 32 | −478.767 | 0.396 | | |
| 33 | ∞ | 1.344 | 1.51633 | 64.1 |
| 34 | ∞ | 0.056 | | |

| Position | D8 | D10 | D17 | D21 | D25 | Focal length |
|---|---|---|---|---|---|---|
| Wide | | | | | | |
| ∞ | 0.125 | 0.776 | 0.940 | 0.302 | 0.215 | 1.00 |
| np | 0.07 | 0.824 | 0.940 | 0.302 | 0.215 | |
| Middle | | | | | | |
| ∞ | 0.125 | 0.555 | 0.769 | 0.378 | 0.530 | 1.18 |
| np | 0.07 | 0.603 | 0.769 | 0.302 | 0.530 | |
| Tele | | | | | | |
| ∞ | 0.125 | 0.346 | 0.510 | 0.499 | 0.879 | 1.43 |
| np | 0.07 | 0.393 | 0.510 | 0.499 | 0.879 | |

TABLE 1-continued

| | |
|---|---|
| magnification m at the wide-angle end, when focused at the near point: = | −46.442 |
| Condition (1) value: $f_2 / f$: = | 2.27 |
| Condition (2) value: $f_3 / f$: = | 2.61 |
| Condition (3) value: $f_5 / f$: = | 2.30 |
| Condition (4) value: $f_1 / f$: = | −1.22 |
| Condition (5) value: $f_1 / f_{1A}$: = | 0.52 |

FIGS. 3A–3D show the spherical aberration, astigmatism, distortion, and lateral color, respectively, of the zoom lens of Embodiment 1 at the wide-angle end when at the nearest focus position, FIGS. 4A–4D show these aberrations at the mid-position of zoom when at the nearest focus position, and FIGS. 5A–5D show these aberrations at the telephoto end when at the nearest focus position. The spherical aberration is shown for the d, F and C lines, the astigmatism is shown for both the sagittal S and tangential T image surfaces, and the lateral color is shown for the F and C lines. The F number at the given zoom position is indicated on FIGS. 3A, 4A and 5A and the half-image angle ω is listed on FIGS. 3B–3D, 4B–4D and 5B–5D.

As is apparent from FIGS. 3A to 5D and the bottom portion of Table 1, the wide-angle zoom lens of Embodiment 1 has its aberrations favorably corrected over the entire range of zoom. Further, the zoom lens is compact and has a sufficient back focus for the insertion of, for example, a beam combining optical system. In addition, light on the reducing side is nearly telecentric, and the lens provides an image angle 2ω at the wide-angle end of 68.6 degrees, which is large as compared to conventional zoom lenses.

Embodiment 2

The zoom lens of Embodiment 2 has nearly the same lens element configuration as that of Embodiment 1, and thus is not separately illustrated.

Table 2 below lists the surface number # in sequential order from the magnification side, the radius of curvature R, the on-axis spacing D between surfaces, as well as the index of refraction $N_d$ and the Abbe number $v_d$ (both at the d line) of the optical elements of the wide-angle zoom lens according to Embodiment 2 of the invention. For convenience in scaling the values of R and D to produce a lens of a desired focal length, the data in the table has been normalized so that the focal length f of the zoom lens is unity at the wide-angle end. In the middle portion of the table are listed the values of the variable spacings D8, D10, D17, D21 and D25 for an object/projection distance at infinity as well as the focal length for each of the wide-angle end (Wide), the middle position of zoom (Middle), and at the telephoto end (Tele). To the left of these values is listed "∞" to indicate that the data given on the particular line is for an object/projection distance at infinity. In the line below the data for each of these positions are listed the spacings which focus the lens at the zoom position of the line above to a nearby object/projection screen distance. To the left of these values is listed "np" to indicate that the data given on the particular line is for an object/projection distance at the near point. In the bottom portion of the table is listed the magnification at the wide-angle end when focused on an object/projection distance at the near point np, as well as the values corresponding to each of Conditions (1) to (5) for this embodiment.

TABLE 2

| # | R | D | $N_d$ | $v_d$ |
|---|---|---|---|---|
| 1 | 3.964 | 0.319 | 1.71300 | 53.9 |
| 2 | 16.234 | 0.008 | | |
| 3 | 2.863 | 0.129 | 1.77250 | 49.6 |
| 4 | 1.267 | 0.328 | | |
| 5 | 4.025 | 0.107 | 1.71300 | 53.9 |
| 6 | 1.595 | 0.496 | | |
| 7 | −1.606 | 0.100 | 1.48749 | 70.4 |
| 8 | −1.772 | D8 (variable) | | |
| 9 | −2.488 | 0.099 | 1.49700 | 81.6 |
| 10 | 4.449 | D10 (variable) | | |
| 11 | −8.421 | 0.084 | 1.84666 | 23.8 |
| 12 | 2.674 | 0.317 | 1.80420 | 46.5 |
| 13 | −3.278 | 0.006 | | |
| 14 | 4.031 | 0.171 | 1.80518 | 25.5 |
| 15 | −19.471 | 0.006 | | |
| 16 | 4.128 | 0.251 | 1.80518 | 25.5 |
| 17 | 29.010 | D17 (variable) | | |
| 18 | 1.433 | 0.069 | 1.80518 | 25.5 |
| 19 | 1.096 | 0.088 | | |
| 20 | 1.151 | 0.236 | 1.51823 | 59.0 |
| 21 | −10.896 | D21 (variable) | | |
| 22 | 5.735 | 0.048 | 1.80518 | 25.5 |
| 23 | 1.171 | 0.113 | | |
| 24 | 9.898 | 0.109 | 1.80610 | 40.7 |
| 25 | −4.729 | D25 (variable) | | |
| 26 | −1.168 | 0.088 | 1.80518 | 25.5 |
| 27 | 3.195 | 0.316 | 1.48749 | 70.4 |
| 28 | −1.639 | 0.006 | | |
| 29 | 7.261 | 0.305 | 1.71300 | 53.9 |
| 30 | −2.091 | 0.006 | | |
| 31 | 3.391 | 0.220 | 1.84666 | 23.8 |
| 32 | −16.494 | 0.397 | | |
| 33 | ∞ | 1.348 | 1.51633 | 64.1 |
| 34 | ∞ | 0.051 | | |

| Position | D8 | D10 | D17 | D21 | D25 | Focal length |
|---|---|---|---|---|---|---|
| Wide | | | | | | |
| ∞ | 0.093 | 0.805 | 1.024 | 0.146 | 0.158 | 1.00 |
| np | 0.035 | 0.849 | 1.024 | 0.146 | 0.158 | |
| Middle | | | | | | |
| ∞ | 0.093 | 0.570 | 0.804 | 0.434 | 0.480 | 1.18 |
| np | 0.035 | 0.615 | 0.804 | 0.434 | 0.480 | |
| Tele | | | | | | |
| ∞ | 0.093 | 0.347 | 0.468 | 0.599 | 0.874 | 1.43 |
| np | 0.035 | 0.392 | 0.468 | 0.599 | 0.874 | |

| | |
|---|---|
| magnification m at the wide-angle end, when focused at the near point: = | −46.344 |
| Condition (1) value: $f_2 / f$ = | 1.82 |
| Condition (2) value: $f_3 / f$ = | 2.99 |
| Condition (3) value: $f_5 / f$ = | 2.04 |
| Condition (4) value: $f_1 / f$ = | −1.15 |
| Condition (5) value: $f_1 / f_{1A}$ = | 0.53 |

FIGS. 6A–6D show the spherical aberration, astigmatism, distortion, and lateral color, respectively, of the zoom lens of Embodiment 2 at the wide-angle end when at the nearest focus position, FIGS. 7A–7D show these aberrations at the mid-position of zoom when at the nearest focus position, and FIGS. 8A–8D show these aberrations at the telephoto end when at the nearest focus position. The spherical aberration is shown for the d, F and C lines, the astigmatism is shown for both the sagittal S and tangential T image surfaces, and the lateral color is shown for the F and C lines. The F number at the given zoom position is indicated on FIGS. 6A, 7A and 8A and the half-image angle ω is listed on FIGS. 6B–6D, 7B–7D and 8B–8D.

As is apparent from FIGS. 6A to 8D and the bottom portion of Table 2, the wide-angle zoom lens of Embodiment 2 has its aberrations favorably corrected over the entire range of zoom. Further, the zoom lens is compact and has a sufficient back focus for the insertion of, for example, a beam combining optical system. In addition, light on the reducing side is nearly telecentric, and the lens provides an image angle 2ω at the wide-angle end of 68.8 degrees, which is large as compared to conventional zoom lenses.

Embodiment 3

Figure 2:
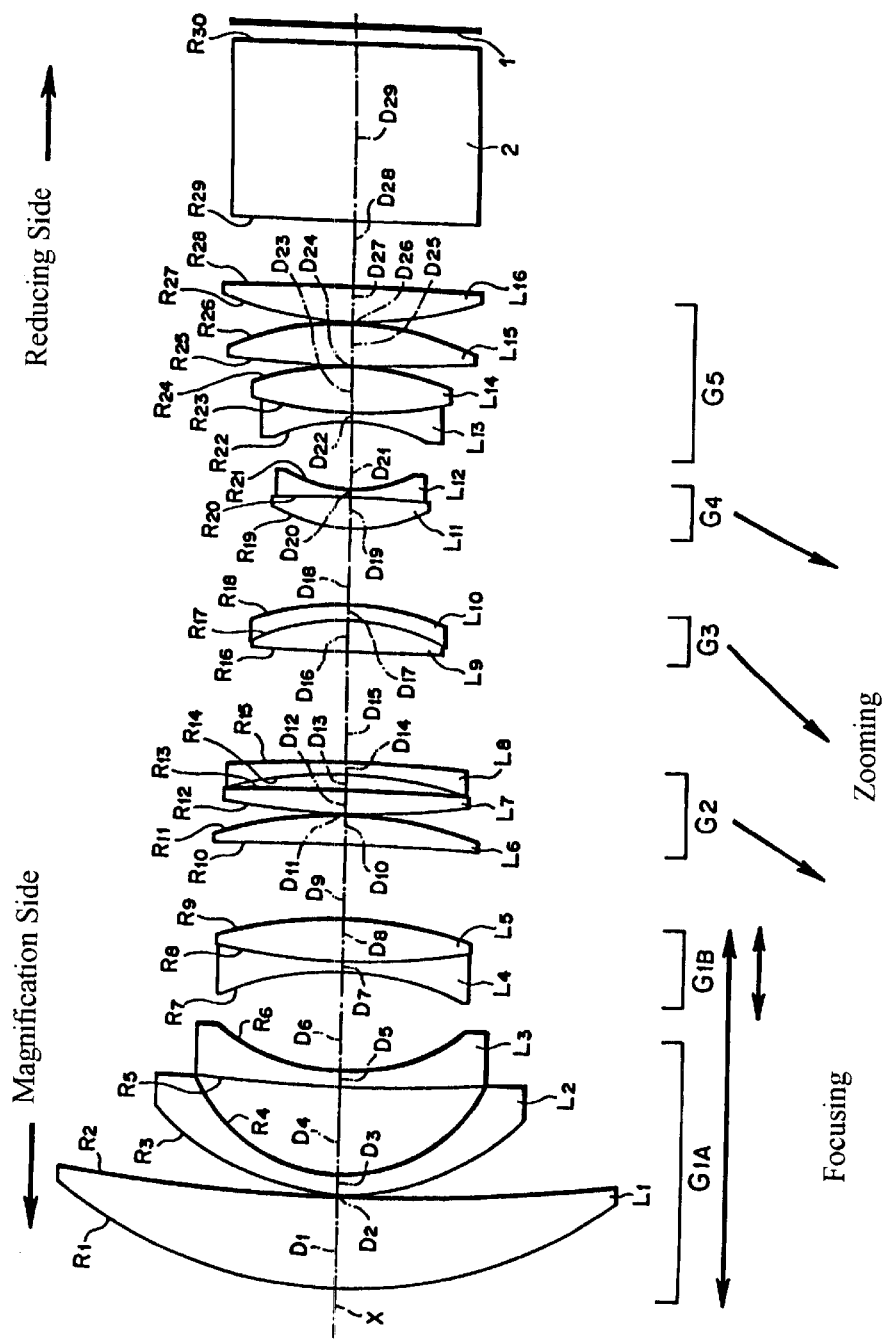
FIG. 2 shows the basic lens element configuration at the wide-angle end of the zoom lens of Embodiment 3, and is also representative of the lens element configuration of Embodiment 4.

FIG. 2 shows the basic lens element configuration of the zoom lens of Embodiment 3 at the wide-angle end. As is illustrated, lens subgroup $G_{1A}$ is formed of three lens elements $L_1$ to $L_3$, and lens subgroup $G_{1B}$ is formed of a biconcave lens element $L_4$ that is cemented to a biconvex lens element $L_5$. The second lens group $G_2$ is formed of three lens elements $L_6$ to $L_8$, and the third lens group $G_3$ is formed of two lens elements $L_9$ and $L_{10}$ that are cemented together. The fourth lens group $G_4$ is formed of two lens elements $L_{11}$ and $L_{12}$ that are cemented together, and the fifth lens group $G_5$ is formed of two lens elements $L_{13}$ and $L_{14}$ that are cemented together and two lens elements $L_{15}$ and $L_{16}$.

Table 3 below lists the surface number # in sequential order from the magnification side, the radius of curvature R, the on-axis spacing D between surfaces, as well as the index of refraction $N_d$ and the Abbe number $v_d$ (both at the d line) of the optical elements of the wide-angle zoom lens according to Embodiment 3 of the invention. For convenience in scaling the values of R and D to produce a lens of a desired focal length, the data in the table has been normalized so that the focal length f of the zoom lens is unity at the wide-angle end. In the middle portion of the table are listed the values of the variable spacings D6, D9, D15, D18 and D21 for an object/projection distance at infinity as well as the focal length for each of the wide-angle end (Wide), the middle position of zoom (Middle), and at the telephoto end (Tele). To the left of these values is listed "∞" to indicate that the data given on the particular line is for an object/projection distance at infinity. In the line below the data for each of these positions are listed the spacings which focus the lens at the zoom position of the line above to a nearby object/projection screen distance. To the left of these values is listed "np" to indicate that the data given on the particular line is for an object/projection distance at the near point. In the bottom portion of the table is listed the magnification at the wide-angle end when focused on an object/projection distance at the near point np, as well as the values corresponding to each of Conditions (1) to (5) for this embodiment.

TABLE 3

| # | R | D | $N_d$ | $v_d$ |
|---|---|---|---|---|
| 1 | 3.199 | 0.609 | 1.51633 | 64.1 |
| 2 | 14.859 | 0.022 | | |
| 3 | 1.720 | 0.125 | 1.71300 | 53.9 |
| 4 | 1.107 | 0.627 | | |
| 5 | 12.109 | 0.111 | 1.83400 | 37.2 |
| 6 | 1.276 | D6 (variable) | | |
| 7 | −1.968 | 0.084 | 1.62041 | 60.3 |
| 8 | 4.238 | 0.303 | 1.51742 | 52.4 |
| 9 | −2.621 | D9 (variable) | | |
| 10 | −24.180 | 0.218 | 1.80400 | 46.6 |
| 11 | −2.481 | 0.08 | | |
| 12 | 5.746 | 0.159 | 1.84666 | 23.8 |
| 13 | −16.551 | 0.094 | | |
| 14 | −3.137 | 0.084 | 1.56883 | 56.4 |
| 15 | −9.864 | D15 (variable) | | |
| 16 | 26.646 | 0.238 | 1.49700 | 81.5 |
| 17 | −1.264 | 0.096 | 1.83400 | 37.2 |

TABLE 3-continued

| | | | | | |
|---|---|---|---|---|---|
| 18 | -1.722 | D18 (variable) | | | |
| 19 | 1.168 | 0.223 | 1.80400 | 46.6 | |
| 20 | -6.751 | 0.047 | 1.71736 | 29.5 | |
| 21 | 0.908 | D21 (variable) | | | |
| 22 | -1.129 | 0.058 | 1.84666 | 23.8 | |
| 23 | 2.870 | 0.306 | 1.51633 | 64.1 | |
| 24 | -1.788 | 0.008 | | | |
| 25 | 10.239 | 0.286 | 1.77250 | 49.6 | |
| 26 | -2.023 | 0.008 | | | |
| 27 | 2.467 | 0.239 | 1.84666 | 23.8 | |
| 28 | -36.618 | 0.195 | | | |
| 29 | ∞ | 1.192 | 1.51633 | 64.1 | |
| 30 | ∞ | | | | |

| Position | D6 | D9 | D15 | D18 | D21 | Focal length |
|---|---|---|---|---|---|---|
| Wide | | | | | | |
| ∞ | 0.754 | 0.452 | 1.780 | 0.562 | 0.460 | 1.00 |
| np | 0.634 | 0.585 | 1.780 | 0.562 | 0.460 | |
| Middle | | | | | | |
| ∞ | 0.754 | 0.375 | 0.695 | 0.666 | 0.518 | 1.06 |
| np | 0.634 | 0.507 | 0.695 | 0.666 | 0.518 | |
| Tele | | | | | | |
| ∞ | 0.754 | 0.329 | 0.639 | 0.708 | 0.577 | 1.10 |
| np | 0.634 | 0.462 | 0.639 | 0.708 | 0.577 | |

| | |
|---|---|
| magnification m at the wide-angle end, when focused at the near point: = | -33.075 |
| Condition (1) value: $f_2 / f =$ | 2.67 |
| Condition (2) value: $f_3 / f =$ | 4.13 |
| Condition (3) value: $f_5 / f =$ | 1.92 |
| Condition (4) value: $f_1 / f =$ | -1.33 |
| Condition (5) value: $f_1 / f_{1A} =$ | 0.81 |

FIGS. 9A–9D show the spherical aberration, astigmatism, distortion, and lateral color, respectively, of the zoom lens of Embodiment 3 at the wide-angle end when at the nearest focus position, FIGS. 10A–10D show these aberrations at the mid-position of zoom when at the nearest focus position, and FIGS. 11A–11D show these aberrations at the telephoto end when at the nearest focus position. The spherical aberration is shown for the d, F and C lines, the astigmatism is shown for both the sagittal S and tangential T image surfaces, and the lateral color is shown for the F and C lines. The F number at the given zoom position is indicated on FIGS. 9A, 10A and 11A and the half-image angle ω is listed on FIGS. 9B–9D, 10B–10D and 11B–11D.

As is apparent from FIGS. 9A to 11D and the bottom portion of Table 3, the wide-angle zoom lens of Embodiment 3 has its aberrations favorably corrected over the entire range of zoom. Further, the zoom lens is compact and has a sufficient back focus for the insertion of, for example, a beam combining optical system. In addition, light on the reducing side is nearly telecentric, and the lens provides an image angle 2ω at the wide-angle end of 68.0 degrees, which is large as compared to conventional zoom lenses.

Embodiment 4

The zoom lens of Embodiment 4 has nearly the same lens element configuration as that of Embodiment 3 and thus is not separately illustrated.

Table 4 below lists the surface number # in sequential order from the magnification side, the radius of curvature R, the on-axis spacing D between surfaces, as well as the index of refraction $N_d$ and the Abbe number $v_d$ (both at the d line) of the optical elements of the wide-angle zoom lens according to Embodiment 4 of the invention. For convenience in scaling the values of R and D to produce a lens of a desired focal length, the data in the table has been normalized so that the focal length f of the zoom lens is unity at the wide-angle end. In the middle portion of the table are listed the values of the variable spacings D6, D9, D15, D18 and D21 for an object/projection distance at infinity as well as the focal length for each of the wide-angle end (Wide), the middle position of zoom (Middle), and at the telephoto end (Tele). To the left of these values is listed "∞" to indicate that the data given on the particular line is for an object/projection distance at infinity. In the line below the data for each of these positions are listed the spacings which focus the lens at the zoom position of the line above to a nearby object/projection screen distance. To the left of these values is listed "np" to indicate that the data given on the particular line is for an object/projection distance at the near point. In the bottom portion of the table is listed the magnification at the wide-angle end when focused on an object/projection distance at the near point np, as well as the values corresponding to each of Conditions (1) to (5) for this embodiment.

TABLE 4

| # | R | D | $N_d$ | $v_d$ |
|---|---|---|---|---|
| 1 | 3.720 | 0.706 | 1.72916 | 54.7 |
| 2 | 9.410 | 0.048 | | |
| 3 | 2.529 | 0.151 | 1.83481 | 42.7 |
| 4 | 1.316 | 0.704 | | |
| 5 | 12.409 | 0.134 | 1.83400 | 37.2 |
| 6 | 1.486 | D6 (variable) | | |
| 7 | -2.732 | 0.100 | 1.83481 | 42.7 |
| 8 | 3.396 | 0.425 | 1.68893 | 31.1 |
| 9 | -2.906 | D9 (variable) | | |
| 10 | -34.977 | 0.240 | 1.83481 | 42.7 |
| 11 | -3.164 | 0.058 | | |
| 12 | 4.702 | 0.184 | 1.80518 | 25.4 |
| 13 | -1235.18 | 0.094 | | |
| 14 | -4.640 | 0.100 | 1.78590 | 44.2 |
| 15 | -17.464 | D15 (variable) | | |
| 16 | 25.385 | 0.307 | 1.56384 | 60.7 |
| 17 | -1.381 | 0.116 | 1.83400 | 37.2 |
| 18 | -2.036 | D18 (variable) | | |
| 19 | 1.349 | 0.170 | 1.83481 | 42.7 |
| 20 | -11.991 | 0.057 | 1.75520 | 27.5 |
| 21 | 1.103 | D21 (variable) | | |
| 22 | -1.247 | 0.070 | 1.84666 | 23.8 |
| 23 | 2.645 | 0.347 | 1.49700 | 81.5 |
| 24 | -1.887 | 0.105 | | |
| 25 | 24.567 | 0.376 | 1.69680 | 55.5 |
| 26 | -2.073 | 0.010 | | |
| 27 | 3.141 | 0.303 | 1.84666 | 23.8 |
| 28 | -9.577 | 0.234 | | |
| 29 | ∞ | 1.433 | 1.51633 | 64.1 |
| 30 | ∞ | | | |

| Position | D6 | D9 | D15 | D18 | D21 | Focal length |
|---|---|---|---|---|---|---|
| Wide | | | | | | |
| ∞ | 0.878 | 0.559 | 1.760 | 0.663 | 0.550 | 1.00 |
| np | 0.704 | 0.745 | 1.760 | 0.663 | 0.550 | |
| Middle | | | | | | |
| ∞ | 0.878 | 0.461 | 0.695 | 0.743 | 0.632 | 1.06 |
| np | 0.704 | 0.648 | 0.695 | 0.743 | 0.632 | |
| Tele | | | | | | |
| ∞ | 0.878 | 0.404 | 0.659 | 0.689 | 0.778 | 1.10 |
| np | 0.704 | 0.591 | 0.659 | 0.689 | 0.778 | |

TABLE 4-continued

| | |
|---|---|
| magnification m, at the wide-angle end, when focused at the near point: = | −39.280 |
| Condition (1) value: $f_2 / f$ = | 3.37 |
| Condition (2) value: $f_3 / f$ = | 4.17 |
| Condition (3) value: $f_5 / f$ = | 2.06 |
| Condition (4) value: $f_1 / f$ = | −1.42 |
| Condition (5) value: $f_1 / f_{1A}$ = | 0.87 |

FIGS. 12A–12D show the spherical aberration, astigmatism, distortion, and lateral color, respectively, of the zoom lens of Embodiment 4 at the wide-angle end when at the nearest focus position, FIGS. 13A–13D show these aberrations at the mid-position of zoom when at the nearest focus position, and FIGS. 14A–14D show these aberrations at the telephoto end when at the nearest focus position. The spherical aberration is shown for the d, F and C lines, the astigmatism is shown for both the sagittal S and tangential T image surfaces, and the lateral color is shown for the F and C lines. The F number at the given zoom position is indicated on FIGS. 12A, 13A and 14A and the half-image angle ω is listed on FIGS. 12B–12D, 13B–13D and 14B–14D.

As is apparent from FIGS. 12A to 14D and the bottom portion of Table 4, the wide-angle zoom lens of Embodiment 4 has its aberrations favorably corrected over the entire range of zoom. Further, the zoom lens is compact and has a sufficient back focus for the insertion of, for example, a beam combining optical system. In addition, light on the reducing side is nearly telecentric, and the lens provides an image angle 2ω at the wide-angle end of 77.8 degrees, which is large as compared to conventional zoom lenses.

The invention being thus described, it will be obvious that the same may be varied in many ways. For example the number of lens elements that form each lens group, the radius of curvature R and surfaces spacings D can be appropriately varied. When the wide-angle zoom lens of the invention is used as a projection lens, the image modulator need not be a transmission-type liquid crystal display panel, but may instead be a reflective liquid crystal display panel or another spatial modulator, such as a DMD array. Further, the wide-angle zoom lens of the invention can be used not only as a projector lens but also as an imaging lens to form images onto an image detector, such as a CCD array, camera tube, or silver-salt film. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A wide-angle zoom lens comprising five lens groups of negative, positive, positive, negative, and positive refractive power, respectively, in sequential order from the magnification side, wherein:

the first lens group is fixed during zooming and moves during focusing;

the second, third and fourth lens groups are each moved along the optical axis such that the spacing between these lens groups varies for zooming and correction of what would otherwise be excessive curvature of field caused by zooming;

the fifth lens group is fixed during zooming;

said first lens group is formed of, in sequential order from the magnification side, a first lens subgroup having negative refractive power and a second lens subgroup having negative refractive power, each of said lens subgroups moving relative to the other lens subgroup as well as along the optical axis during focusing; and the following Conditions are satisfied $1.5 < f_2/f < 4.0$ $2.0 < f_3/f < 5.0$ $1.5 < f_5/f < 3.0$ $-1.8 < f_1/f < -0.9$ $0.4 < f_1/f_{1A} < 1.0$ where f is the focal length of the zoom lens at the wide-angle end, $f_1$ is the focal length of the first lens group, $f_2$ is the focal length of the second lens group, $f_3$ is the focal length of the third lens group, $f_5$ is the focal length of the fifth lens group, and $f_{1A}$ is the focal length the first lens subgroup of the first lens group.

2. The wide-angle zoom lens according to claim 1, wherein the lens element that is nearest the magnification side in said second lens subgroup has a concave surface on the magnification side.

3. The wide-angle zoom lens according to claim 1, wherein the on-axis spacing between the second lens group and the third lens group is reduced when zooming toward the telephoto end.

4. The wide-angle zoom lens according to claim 2, wherein the on-axis spacing between the second lens group and the third lens group is reduced when zooming toward the telephoto end.

5. The wide-angle zoom lens according to claim 1, in combination with a projection-type display unit which includes a light modulator for spatially modulating a projected beam of light with image information.

6. The wide-angle zoom lens according to claim 2, in combination with a projection-type display unit which includes a light modulator for spatially modulating a projected beam of light with image information.

7. The wide-angle zoom lens according to claim 3, in combination with a projection-type display unit which includes a light modulator for spatially modulating a projected beam of light with image information.

8. The wide-angle zoom lens according to claim 4, in combination with a projection-type display unit which includes a light modulator for spatially modulating a projected beam of light with image information.

* * * * *